(12) United States Patent
Lloyd

(10) Patent No.: US 6,459,189 B1
(45) Date of Patent: Oct. 1, 2002

(54) DIECAST ROTOR WITH COMPOUND SHORT-CIRCUIT LOOPS AND METHOD OF MANUFACTURE

(75) Inventor: Jerry D. Lloyd, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/566,474

(22) Filed: May 8, 2000

(51) Int. Cl.[7] .................................................. H02K 1/22
(52) U.S. Cl. ........................ 310/261; 310/211; 310/201; 310/42
(58) Field of Search .................................. 310/211, 212, 310/261, 216, 217, 201, 210, 42

(56) References Cited

U.S. PATENT DOCUMENTS

| | | | | |
|---|---|---|---|---|
| 1,784,815 A | * | 12/1930 | Apple ........................... | 310/166 |
| 4,692,647 A | * | 9/1987 | Oh et al. ...................... | 310/212 |
| 4,761,602 A | * | 8/1988 | Leibovich ..................... | 318/816 |
| 5,028,804 A | * | 7/1991 | Lauw ........................... | 290/40 C |
| 5,157,292 A | * | 10/1992 | Morrill ......................... | 310/42 |
| 5,955,811 A | * | 9/1999 | Chiba et al. .................. | 310/211 |
| 6,088,906 A | * | 7/2000 | Hsu et al. ..................... | 310/211 |
| 6,229,241 B1 | * | 5/2001 | Ishigami et al. ............... | 29/596 |
| 6,252,327 B1 | * | 6/2001 | Matsuzaki .................... | 310/180 |

\* cited by examiner

Primary Examiner—Burton S. Mullins
(74) Attorney, Agent, or Firm—Howrey Simon Arnold & White, LLP

(57) ABSTRACT

An improved rotor for an induction motor is disclosed. In one aspect of the disclosed invention, endshield laminations are placed on the top and bottom of a lamination stack of a rotor. The endshields have holes therein which mask the ends of the bar members within the lamination stack. The unmasked portions of the bar members are connected through the holes to connection members in such a fashion to make multiple compound short-circuit loops. Because the endshields, like the laminations generally, are not conductive, the connection members are only in contact with the bar members through the holes in the endshield, which prevents the multiple loops from shorting to one another. The bar members and connector members are preferably die-cast in and around the rotor laminations and the endshields.

14 Claims, 7 Drawing Sheets

DIECAST ROTOR WITH COMPOUND SHORT-CIRCUIT LOOPS AND METHOD OF MANUFACTURE

FIELD OF THE INVENTION

The present invention relates in general to electromagnetic machines, and more specifically to the structure and the method of manufacturing rotors in electromagnetic machines.

BACKGROUND OF THE INVENTION

Induction machines with rotors incorporating compound short-circuit loops with open loop portions have been shown to have certain performance advantages over traditional "squirrel-cage" induction machines. U.S. Pat. No. 4,761,602, issued on Aug. 2, 1988 to Leibovich and entitled "Compound Short-Circuit Induction Machine and Method of Its Control," and which is incorporated herein by reference in its entirety, demonstrates these performance advantages and also discloses one possible construction of such a compound loop in relative position to a rotor.

The enhancements in performance of the compound short-circuit induction machine come, however, at a price of increased complexity in manufacturing. The rotors of such machines must be manufactured such that the windings of each three-dimensional compound loop are positioned within slots located at the peripheral portion of the rotor. In an N-phase induction machine, there are typically N compound loops that must overlap in three-dimensional space without coming into contact or "short circuiting" with one another, with every winding of each compound loop positioned within one of the said slots. Winding and connecting the windings in this configuration present significant challenges in manufacturing.

By contrast, ease of manufacturing is well-noted as a primary advantage of the traditional "squirrel-cage" induction machine. In these machines, die-cast aluminum bar members are typically formed in the laminations, thereby replacing the need for windings on the rotor. In this configuration, end rings are attached to the bar members by welding, brazing, or die-casting to form the "squirrel-cage" structure. This simple structure and method of construction of the squirrel-cage design has been utilized by numerous rotating machines. For example, U.S. Pat. No. 5,028,804, issued on Jul. 2, 1991 to Lauw, et al. and entitled "Brushless Doubly-Fed Generator Control System," and which is incorporated herein by reference in its entirety, describes the formation of U-shaped coils by removing one of the end rings of a squirrel-cage structure and connecting appropriate bar members. U.S. Pat. No. 4,692,647, issued on Sept. 8, 1987 to Oh, et al. and entitled "Rotor Construction in an Induction Motor for Eliminating Rotor Reaction," and incorporated herein by reference in its entirety, describes the formation of multiple, two-dimensional ring-shaped coils by die-casting the coils within the rotor to form a single body.

Adaptation of the simple structure and method of construction of the die-cast squirrel-cage design to manufacture a rotor containing multiple compound short-circuit loops would make manufacturing such a rotor easier, but the complexity of the compound loop structure has heretofore prevented such an adaptation. Thus, there is a need in the art for a machine that combines the performance advantages of the compound short-circuit induction machine with the ease of manufacture associated with the die-cast squirrel-cage induction machine.

SUMMARY OF THE INVENTION

The present invention in a broad aspect addresses the problems and shortcomings mentioned above. Specifically, an embodiment of the invention involves the use of endshield laminations to be placed on the top and bottom of a lamination stack of a rotor. The endshields have holes therein which mask the ends of the bar members within the lamination stack. The unmasked portions of the bar members are connected through the holes to connection members in such a fashion to make multiple compound short-circuit loops. Because the endshields, like the laminations generally, are not conductive, the connection members are only in contact with the bar members through the holes in the endshield, which prevents the multiple loops from shorting to one another. The bar members and connector members are preferably die-cast in and around the rotor laminations and the endshields.

BRIEF DESCRIPTION OF THE DRAWINGS

The foregoing and other advantages of the invention will become apparent upon reading the following detailed description and upon reference to the drawings in which:

FIG. 2b illustrates a stack of the laminations of FIG. 2a.

FIG. 3a illustrates a compound loop forming a portion of the rotor of the induction machine FIG. 1.

FIG. 3b is an expanded view of a portion of the compound loop of FIG. 3a.

DESCRIPTION OF ILLUSTRATIVE EMBODIMENTS

Figure 1:
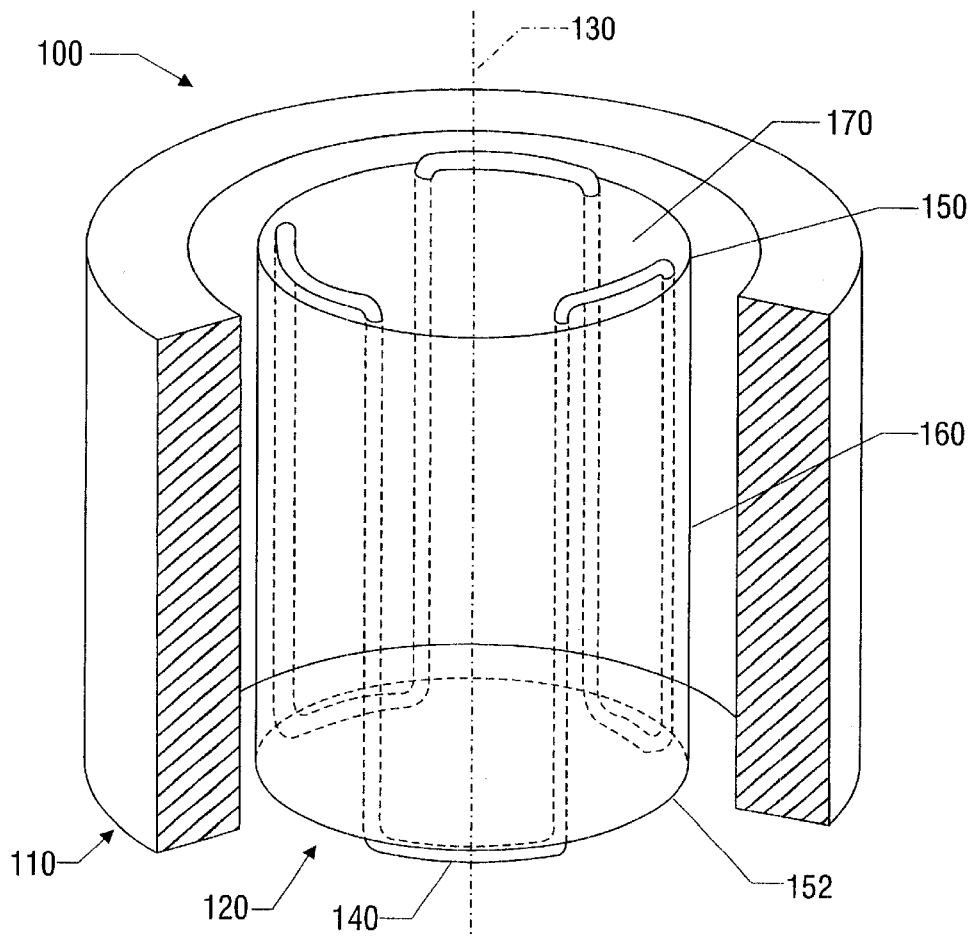
FIG. 1 illustrates an induction machine in accordance with an embodiment of the present invention.

Illustrative embodiments of the invention are described below as they might be employed in an induction machine. FIG. 1 depicts a simplified representation of a rotating induction machine 100 in accordance with an embodiment of the present invention. The rotating induction machine 100 comprises a stator 110 and a rotor 120 positioned concentrically within the stator 110 for rotational movement about an axis of rotation 130 and relative to the stator 110. The rotor 120 has a first end 150, a second end 152, a periphery 160, and a core 170 containing a plurality of compound loops 140 (only one of which is shown). The laminations that comprise the bulk of the core 160 are not shown in FIG. 1 for simplicity.

Figure 2A:
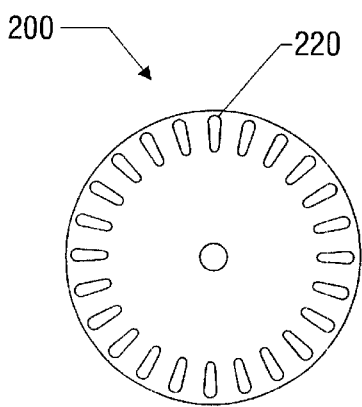
FIG. 2a illustrates a lamination useful in the construction of a rotor core in accordance with an embodiment of the invention.
Figure 2B:
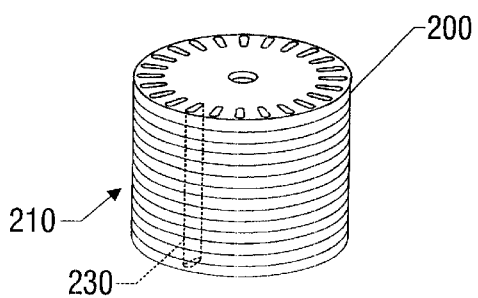

FIGS. 2a and 2b illustrate a plurality of laminations 200 that are positioned in a stack 210 to form a portion of the core 170 of the rotor 120. Each lamination 200 has a plurality of holes 220 proximate the peripheral portion of the lamination. When the laminations 200 are as stacked, the holes 220 form a plurality of slots 230. Each of the slots 230 will eventually accompany a bar member, as described further in FIG. 3*a* and the text accompanying that figure.

Figure 2C:
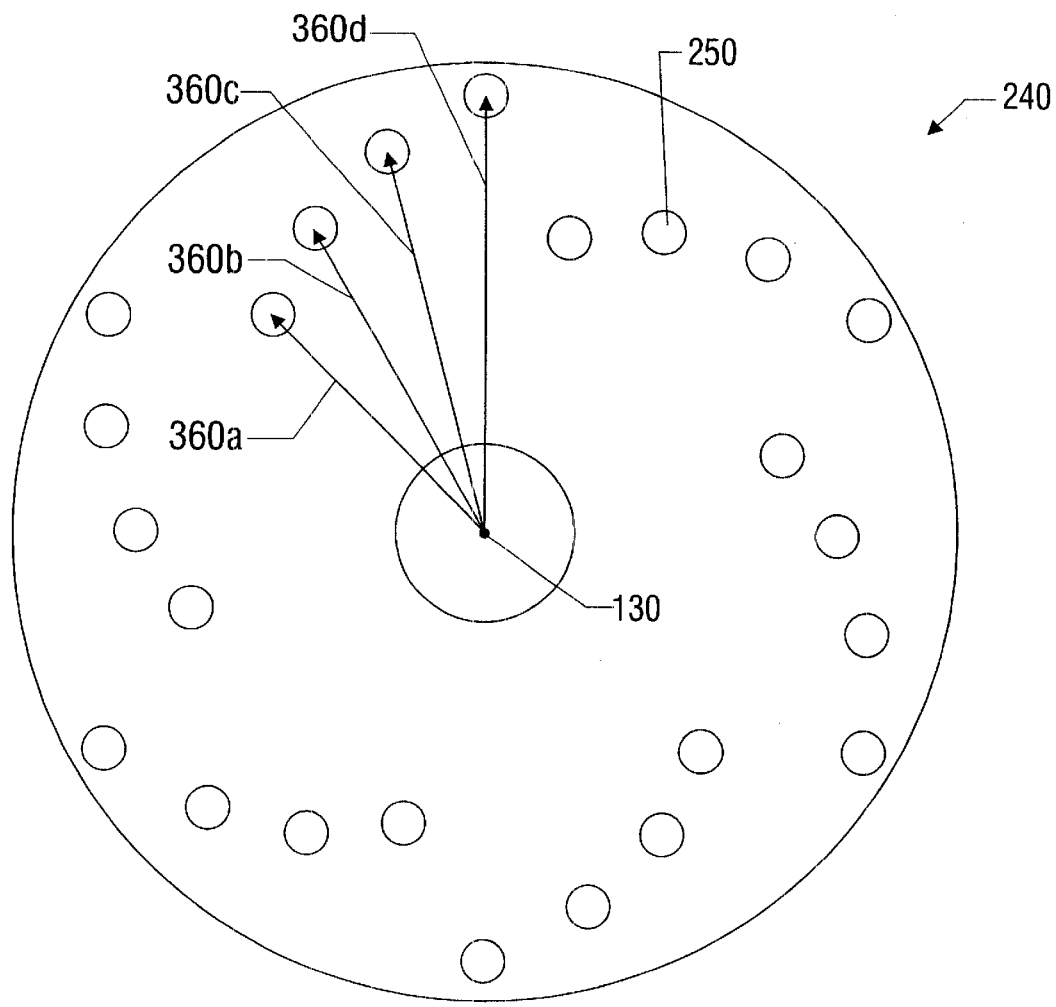
FIG. 2c illustrates a special lamination, called an endshield, useful in the construction of a rotor core in accordance with an embodiment of the invention.
Figure 2D:
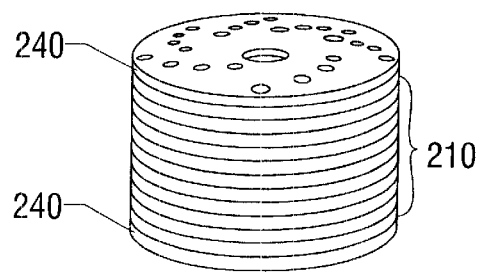
FIG. 2d illustrates the addition of the endshield of FIG. 2c to the lamination stack of FIG. 2b.

FIG. 2*c* illustrates two special laminations, referred to herein as "endshields" 240, which are placed on the end of the lamination stack of FIG. 2*b*, as shown in FIG. 2*d*. Endshields 240 contain holes 250 therein for selectively exposing a portion of the slots 230 formed by the middle laminations 200. By using these endshields 240, the bar members and connector members can be die-cast to form a structure including a plurality of compound short-circuit loops. The details of this structure will be described later.

Figures 3A, 3B:
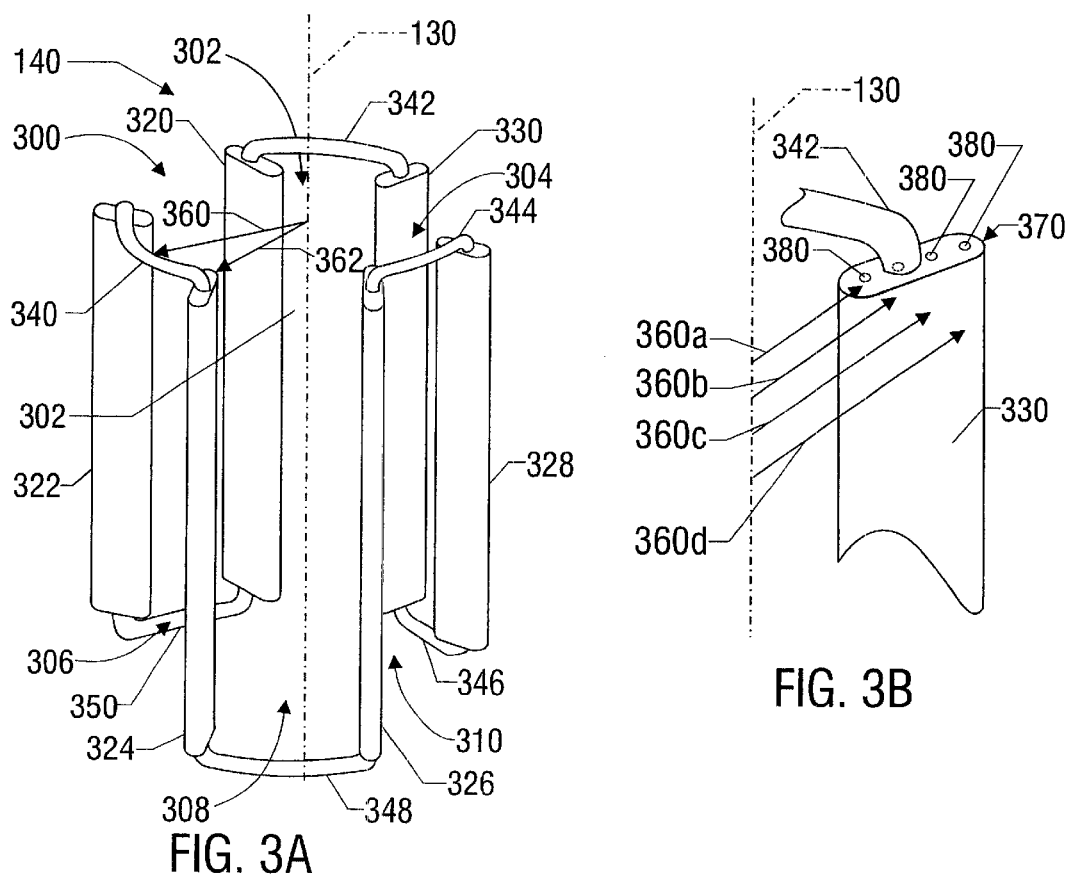

FIG. 3*a* depicts a detailed picture of the compound loop 140 that is to be die-casted around and within laminations 200 and endshields 240 with the laminations and endshield removed for clarity. The compound loop 140 is a closed loop comprising open loop portions 300, 302, 304, 306, 308, 310, bar members 320, 322, 324, 326, 328, 330, and connector members 340, 342, 344, 346, 348, 350. Each of the connector members 340, 342, 344, 346, 348, 350 is positioned to selectively connect at least two of the bar members 320, 322, 324, 326, 328, 330 to form at least one of the open loop portions 300, 302, 304, 306, 308, 310. For example, the connector member 342 is positioned to selectively connect the bar members 330 and 320 to form the open loop portion 302.

In the present embodiment, the bar members 320, 322, 324, 326, 328, 330 are formed by die-casting within the slots 230 in the stack of laminations a material such as aluminum. A plurality of methods such as die-casting, welding, and brazing may then be used to accomplish the selective connection made by one of the connector members 340, 342, 344, 346, 348, 350 to at least two of the bar members 320, 322, 324, 326, 328, 330. Preferably, both the bar members and the connector members are die-cast in one process step, as will be explained in more detail later. As previously mentioned, die-casting takes advantage of the structure and method of construction of the traditional squirrel-cage rotor design in induction machines, yielding a simple and robust rotor structure.

In the disclosed embodiment of the invention, the rotating induction machine 100 has at four phases and six poles. The four phases of the machine correspond to four compound loops sharing the same axis of rotation 130. Referring again to FIG. 3*a*, the compound loop 140, which is one of the four compound loops, includes six bar members 320, 322, 324, 326, 328, 330, corresponding to the six poles of the machine. The bar members are located at a distance 362 from the axis of rotation 130, and the six connector members 340, 342, 344, 346, 348, 350 are located at a distance 360 from the axis of rotation 130. The distance 362 is the same for all of the four compound loops. The distance 360 is, however, different for each of the four compound loops in one embodiment of the invention.

FIG. 3*b* illustrates a detailed view of one of the bar members and its associated connector member. The bar member 330 is used as an example. The bar member 330, at some portion along its length, has an elongated cross-sectional shape 370 which provides points of contact 380 at four distinct distances 360*a–d* from the axis of rotation 130. The four distances 360*a–d* represent the four different values of the distance 360 corresponding to the four compound loops as mentioned in the preceding paragraph. The connector member 342 connects to the bar member 330 by connecting to one of the points of contact 380.

Figure 4:
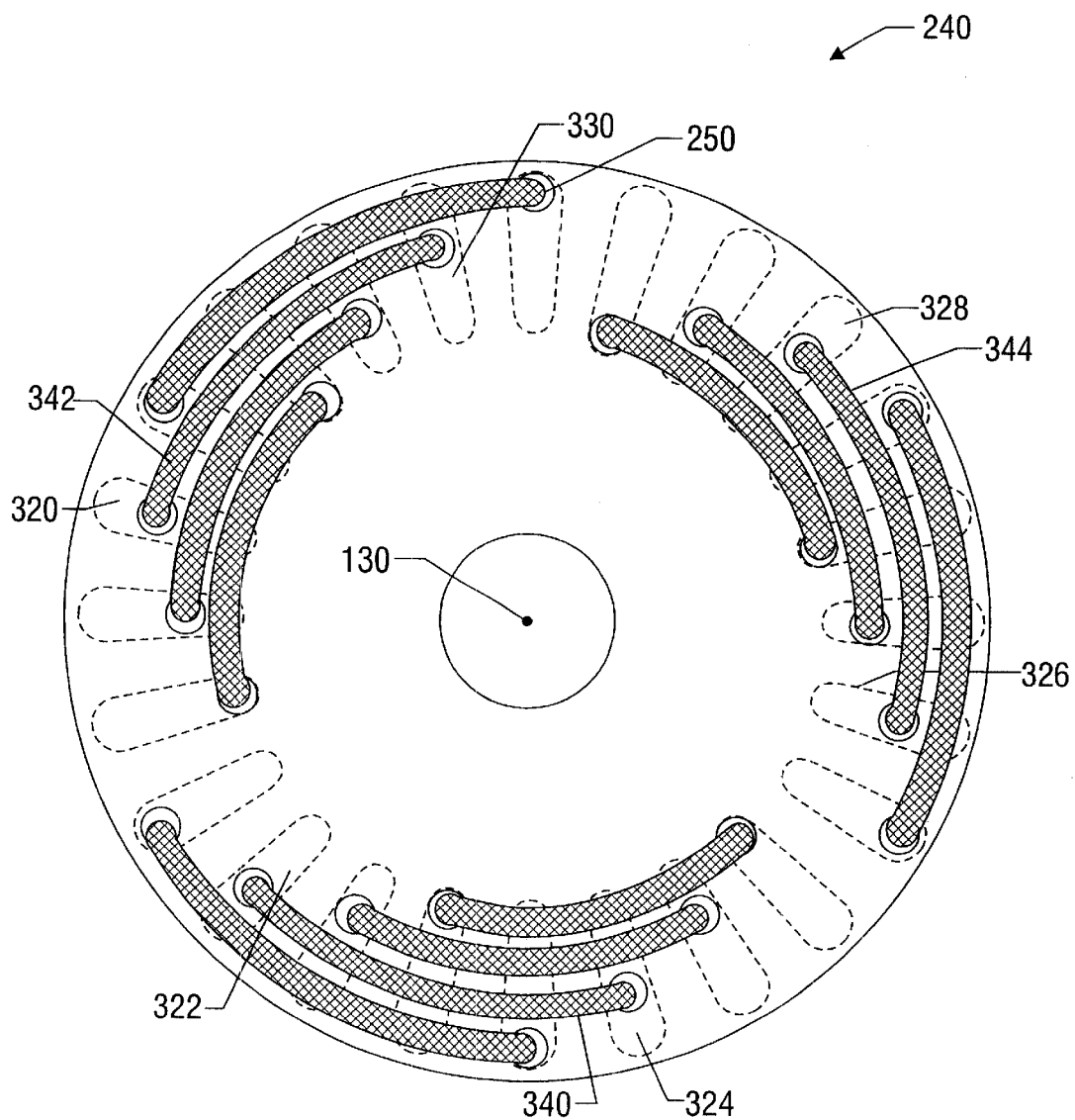
FIG. 4 illustrates the top view of a rotor core constructed in accordance with an embodiment of the invention.
Figure 5:
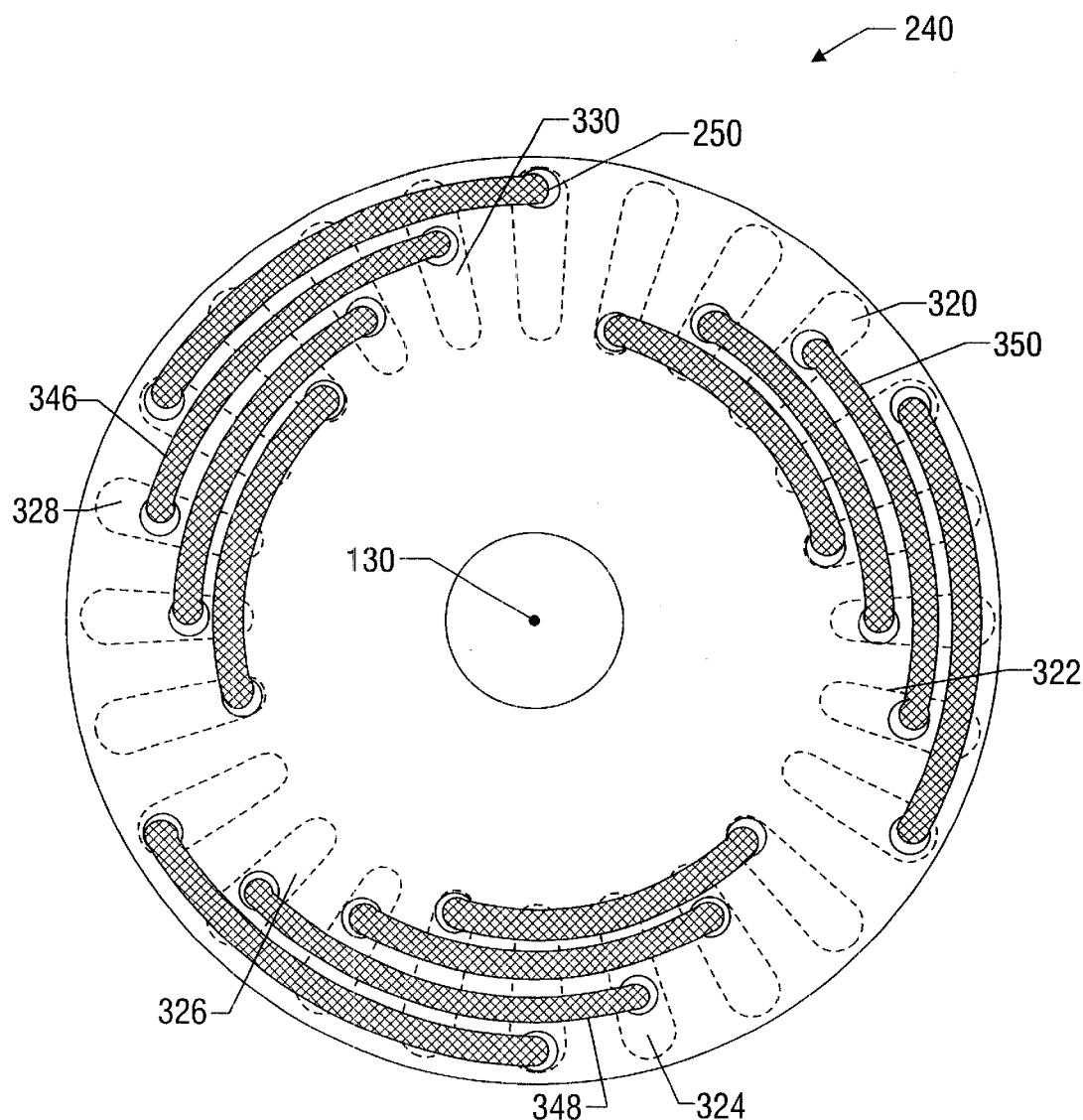
FIG. 5 illustrates the bottom view of a rotor core constructed in accordance with an embodiment of the invention.

FIGS. 4 and 5 illustrate how endshields 240 assist in the connection of the connector members to the bar members to form multiple compound short-circuit loops. As previously noted, endshields 240 are placed on the top and the bottom of a stack of laminations 200, as shown in FIG. 2*d*. FIG. 4 shows the top view of a completed rotor from which an endshield 240 and twelve connector members are visible. (Three of these connector members, corresponding to the compound loop of FIG. 3*a*, are labeled as 340, 342, and 344). FIG. 5 shows the bottom view of the completed rotor from which another endshield 240 and twelve connector members are seen. (Three of these connector members, corresponding to the compound loop of FIG. 3*a*, are labeled as 346, 348, and 350).

As shown in FIG. 2*c*, the endshield 240 includes twenty-four holes 250 in four sets of six holes each, where each set of holes correspond to a particular compound loop and lies at one of the four distances 360*a–d* from the axis of rotation 130. Accordingly, when the endshields 240 are positioned in conjunction with the lamination stack, each hole 250 selectively exposes a portion of one of the bar members (or more specifically, the slot 230 which will ultimately accompany one of the bar members) at one of the distances 360*a–d*. In this manner, and as a shown in FIGS. 4 and 5, the connector members of each of the compound loops can be constructed on top of the endshield 240 in arcs which appear at one of the four distances 360*a–d*. Importantly, each of the four compound loops is electrically isolated from the three others. Placing the arcing connector members for each of the compound loops at a specific distance ensures that the connector members will not short together. Furthermore, the insulating nature of the endshield laminations 240 ensures that the connector member only come into contact with the bar members at locations of the holes 250 in the endshield 240.

In an actual commercial embodiment, the connector members and the bar member will preferably be die cast in one processing step, as will be discussed shortly. One skilled in the art of motor construction should realize that in such a process the connector members will normally be die cast so that they are wider than the holes 250 in the endshield 240, although this is not strictly required. However, in FIGS. 4–6, portions of the holes 250 are visible to more clearly illustrate the manner in which the connector members communicate with the bar members. Therefore, it should be noted that FIGS. 4–6 are somewhat idealized and do not necessarily represent the way an actual commercial implementation will look when finished.

Figure 6:
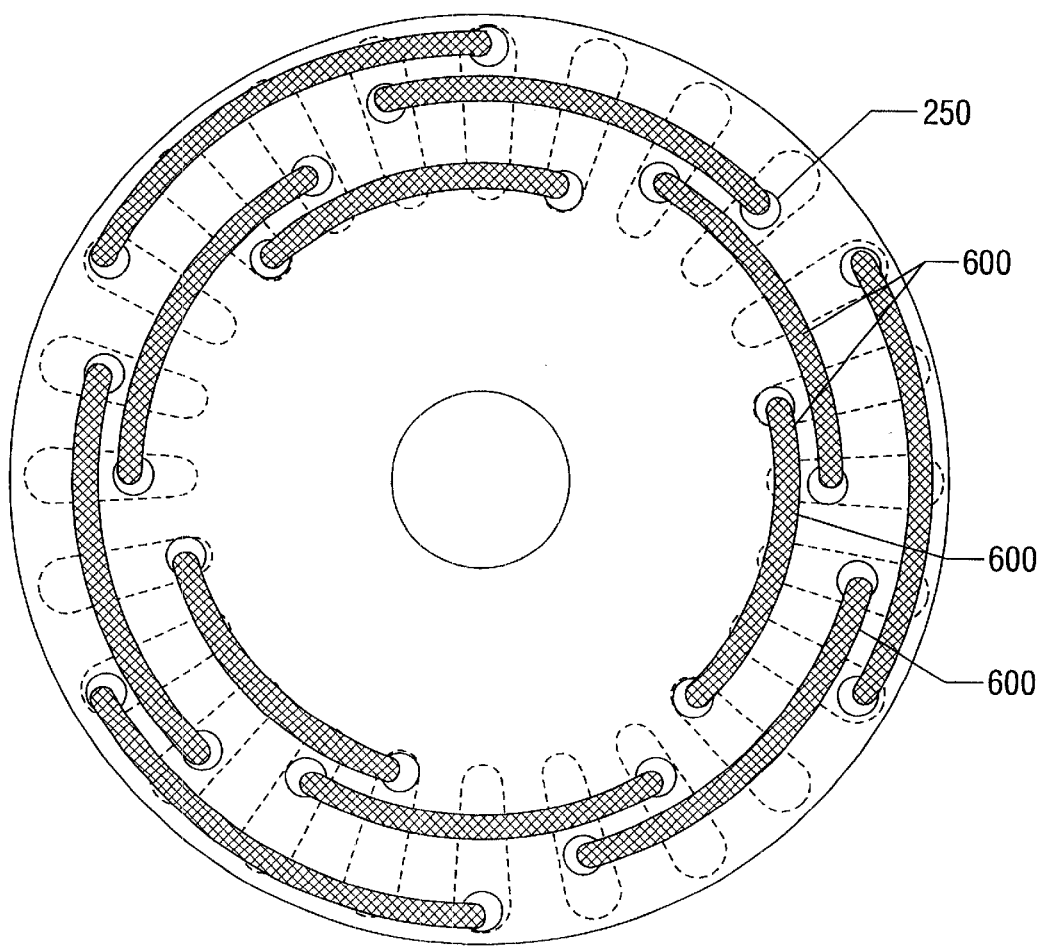
FIG. 6 illustrates the top view of a rotor core constructed in accordance with another embodiment of the invention.
Figure 7:
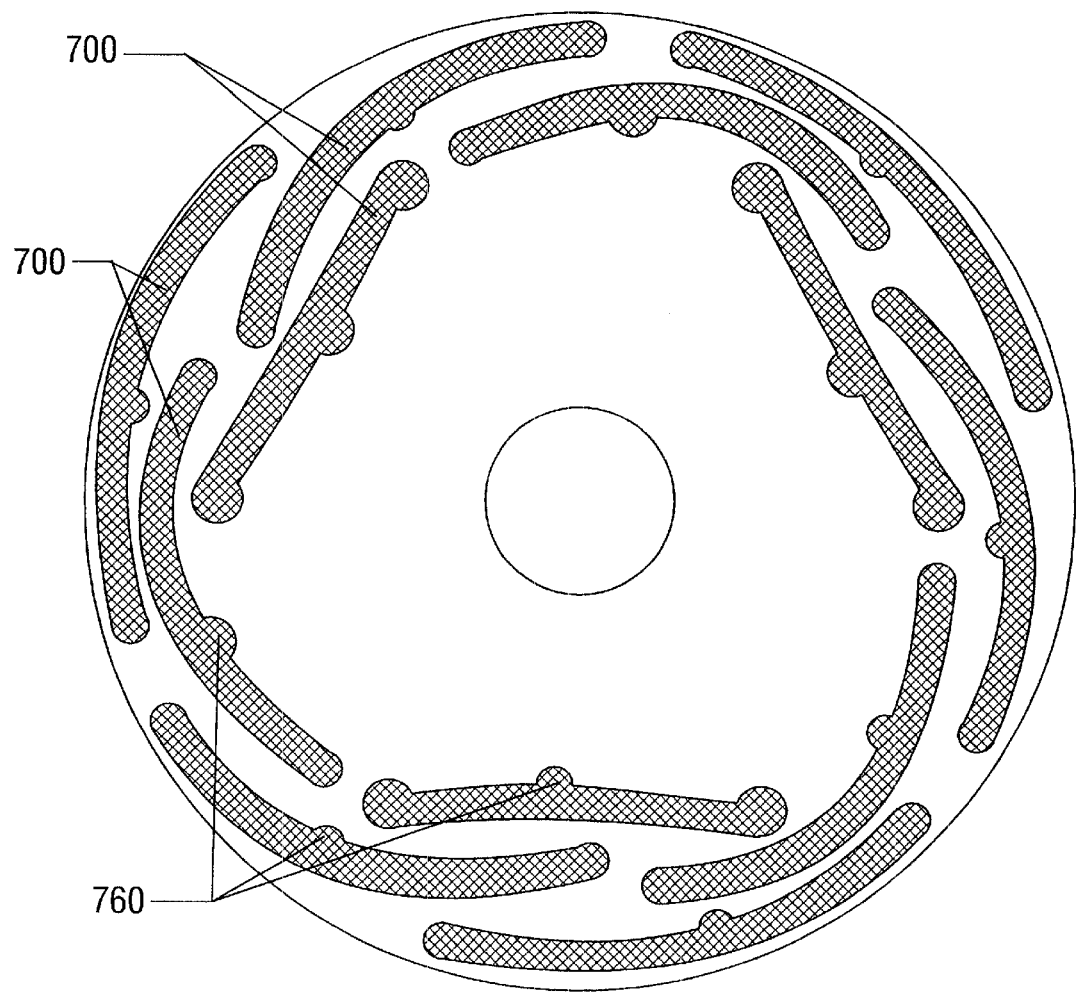
FIG. 7 illustrates the top view of a rotor core constructed in accordance with yet another embodiment of the invention.

Other configurations for the holes 250 in the endshields 240 and the connector members are possible, as shown in FIGS. 6 and 7. (In FIGS. 6 and 7, only the top view of the rotor is shown. One of skill in the art reading this specification will realize that the top view and bottom view will stand in the same relation as FIGS. 4 and 5 to form a complete compound short-circuit loop). FIG. 6 uses the same endshield as in FIG. 4, but the connector members 600 are positioned differently with respect to the holes 250.

In FIG. 7, the location of the holes in the endshield have been modified. In this configuration, which is preferred because it provides the best spacing of the connector members to maximize the space between them, the connector members 700 are not necessarily arcs and do not necessarily contact the bar members through holes at a specific distance from the axis of rotation. FIG. 7 more closely represents what an actual finished rotor will look like from the top. (In fact, nubs 760, which represent the point at which aluminum is introduced into the mold to form the connector members and bar members, are clearly visible). In this Figure, we see that the holes in the endshield are not visible at all because they are obscured by the overlying connector members 700. Of course, the holes in the endshield provide a hole by which the connector members are coupled to the bar members, as shown in FIGS. 4–6. Moreover, as in FIGS. 4–6, any given connector member 700 is made to connect to two bar members with three bar members intervening between. By straddling the connector members appropriately, the configuration of FIG. 7, like those of FIGS. 4–6, represents a four phases, six pole machine. Those skilled in the art will recognize that the disclosed die-cast arrangement could be configured for other phase and pole combinations.

As the process for forming die-cast bar members in a rotor is well known to those of skill in the art of motor manufacturing, only a brief description of an exemplary process used to manufacture an embodiment of the present invention is disclosed. The lamination stack of FIG. 2d is placed inside of a mold. The mold is basically cylindrical like the rotor, except that channels are cut in the top and bottom portions of the mold. These channels correspond to the connector members. Once the endshields are properly oriented with respect to both the middle laminations 200 and the channels in the mold, molten aluminum is introduced into the mold, preferably in the middle of each connector member. The molten aluminum fills up the channels in the mold to form the connector members and then flows down through the holes 250 in the endshields and down into slots 230 to form the various bar members. After the device is cooled, the rotor may be removed from the mold and cleaned appropriately.

The endshields 240 are preferably and easily made from the same laminate material that is used for the laminations 200, with appropriate holes formed therein to affect the desired geometry of the compound short circuit loops. These laminations are typically insulated by annealing which forms an oxide coating on the lamination steel, a fact which keeps a given connector member from shorting out to all of the bar members lying underneath it. Otherwise, any other suitably insulative material that can be easily bound to the laminations 200 will suffice as an endshield.

While it is preferable to die-cast the connector member along with the bar members in the manner described, the connector members can alternatively be connected to the die-cast bar members by welding, brazing, bolting or many other different ways. Additionally, the connector members can comprise simple metallic wires appropriately connected to the bar members. Those of skill in the art that have read this specification will recognize that there are numerous ways of constructing a rotor with multiple compound short-circuit loops in accordance with the inventions disclosed herein.

What is claimed is:

1. A rotor for an electromagnetic machine, the rotor positioned for rotational movement about an axis of rotation, the rotor comprising:
    a core; and
    a plurality of compound loops fixed to the core, wherein each compound loop is electrically isolated from other compound loops, each compound loop comprising:
        a plurality of open loop portions, each open loop portion located proximate to a peripheral portion of the rotor;
        a plurality of unitary bar members molded within the core extending along the peripheral portion of the rotor; and
        a plurality of unitary connector members, each connector member selectively connecting at least two of the bar members to form one of the plurality of open loop portions.

2. The rotor in claim 1, wherein the core comprises a stack of laminations, and wherein at least one portion of the plurality of compound loops is die-cast within the stack of laminations.

3. The rotor in claim 1, wherein each connector member selectively connects at least two of the bar members by die-casting.

4. The rotor in claim 1, wherein each connector member selectively connects at least two of the bar members by welding.

5. The rotor in claim 1, wherein each connector member selectively connects at least two of the bar members by brazing.

6. The rotor in claim 1, wherein each of the plurality of bar members has an elongated cross-section at some portion along the length of the bar member, the elongated cross-section providing a plurality of points of contact at a plurality of radial distances from the axis of rotation, one of the points of contact connecting the bar member to at least one of the plurality of connector members.

7. The rotor in claim 1, wherein the core comprises at least one endshield at an end portion of the rotor, wherein the endshield includes a plurality of openings which expose a plurality of the bar members to allow at least one of the connecting members to connect to at least one of the bar members.

8. The rotor in claim 7, wherein the endshield is a rotor lamination.

9. A rotor for an electromagnetic machine, the rotor positioned for
    rotational movement about an axis of rotation, the rotor comprising:
        a core; and
        plurality of compound loops fixed to the core, wherein each compound loop is electrically isolated from other compound loops, each compound loop comprising:
            a plurality of open loop portions, each open loop portion located proximate to a peripheral portion of the rotor;
            a plurality of unitary bar members molded within the core extending along the peripheral portion of the rotor; and
            means for selectively connecting at least two of the bar members to form one of the plurality of open loop portions.

10. The rotor in claim 9, wherein the core comprises a stack of laminations, and wherein at least one portion of the plurality of compound loops is die-cast within the stack of laminations.

11. The rotor in claim 9, wherein the means for selectively connecting includes a die-casted member and an endshield containing holes therein.

12. A rotor for an electromagnetic machine, the rotor positioned for
    rotational movement about an axis of rotation, the rotor comprising:
        a core; and
        a plurality of compound loops fixed to the core, wherein each compound loop is electrically isolated from other compound loops, each compound loop comprising:

plurality of open loop portions, each open loop portion located proximate to a peripheral portion of the rotor;

a plurality of unitary bar members molded within the core extending along the peripheral portion of the rotor;

means for exposing a portion of the plurality of bar members; and a plurality of unitary connector members, each connector member selectively connecting at least two of the bar members at its exposed portion to form one of the plurality of open loop portions.

13. The rotor in claim 12, wherein the means for exposing comprises at least one endshield in a position perpendicular to the axis of rotation.

14. The rotor in claim 12, wherein the endshield is a lamination at an end portion of the rotor.

\* \* \* \* \*

UNITED STATES PATENT AND TRADEMARK OFFICE
CERTIFICATE OF CORRECTION

PATENT NO. : 6,459,189 B1
DATED : October 1, 2002
INVENTOR(S) : Jerry D. Lloyd

It is certified that error appears in the above-identified patent and that said Letters Patent is hereby corrected as shown below:

Column 6,
Line 39, please delete "plurality" and insert -- a plurality --.

Column 7,
Line 1, please delete "plurality" and insert -- a plurality --.

Column 8,
Line 7, please delete "claim 12," and insert -- claim 13, --.

Signed and Sealed this

Twenty-fifth Day of March, 2003

JAMES E. ROGAN
*Director of the United States Patent and Trademark Office*